US008502657B2

(12) United States Patent
Fleming (10) Patent No.: US 8,502,657 B2
(45) Date of Patent: Aug. 6, 2013

(54) USER CUSTOMIZABLE MONITORING SYSTEM

(75) Inventor: Kweku David Fleming, Leawood, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 13/325,187

(22) Filed: Dec. 14, 2011

(65) Prior Publication Data

US 2012/0081224 A1   Apr. 5, 2012

Related U.S. Application Data

(63) Continuation of application No. 12/370,059, filed on Feb. 12, 2009, now Pat. No. 8,102,250.

(51) Int. Cl.
*G08B 23/00* (2006.01)

(52) U.S. Cl.
USPC . 340/517; 340/521; 340/539.22; 340/539.26; 235/472.01

(58) Field of Classification Search
USPC ............... 340/517, 521, 539.22, 539.26, 506, 340/539.1, 539.11, 539.23, 539.27, 540; 235/472.01
See application file for complete search history.

(56) References Cited

U.S. PATENT DOCUMENTS

| | | | |
|---|---|---|---|
| 8,102,250 B2 * | 1/2012 | Fleming | 340/517 |
| 2006/0197660 A1 * | 9/2006 | Luebke et al. | 340/539.26 |
| 2007/0126576 A1 * | 6/2007 | Script et al. | 340/545.5 |
| 2007/0139183 A1 * | 6/2007 | Kates | 340/521 |
| 2007/0181694 A1 * | 8/2007 | Pichardo et al. | 235/472.01 |
| 2008/0114548 A1 | 5/2008 | Pavel et al. | |
| 2009/0015403 A1 * | 1/2009 | Kuris et al. | 340/540 |

OTHER PUBLICATIONS

Original Letters Patent No. 8102250 B2; dated Jan. 24, 2012.
U.S. Appl. No. 12/370,059; Issue Notification dated Jan. 4, 2012; 1 page.
U.S. Appl. No. 12/370,059; Non-Final Office Action dated May, 19, 2011; 8 pages.
U.S. Appl. No. 12/370,059; Notice of Allowance dated Sep. 19, 2011; 5 pages.

* cited by examiner

*Primary Examiner* — Brent Swarthout
(74) *Attorney, Agent, or Firm* — Swanson & Bratschun, L.L.C.

(57) ABSTRACT

Embodiments of the disclosed invention provide a user customizable monitoring system. For example, in one embodiment, the user customizable monitoring system includes a set of user-programmable portable sensors and a communication hub for enabling a user to customize features associated with the set of user-programmable portable sensors. In one embodiment, the communication hub is further configured to receive data from the set of user programmable portable sensors and perform a user specified action based on the received data. In some embodiments, a user selects any desired combination of different types of user-programmable portable sensors that come preconfigured to operate with the communication hub. Additionally, in some embodiments, a user may configure particular parameters associated with a user-programmable portable sensor using the communication hub.

20 Claims, 4 Drawing Sheets

USER CUSTOMIZABLE MONITORING SYSTEM

CROSS-REFERENCE TO RELATED CASES

This application is a continuation of U.S. application Ser. No. 12/370,059 now U.S. Pat. No. 8,102,250 (the "059 Application" filed Feb. 12, 2009 by Fleming and entitled, "User Customizable Monitoring System," the entire disclosure of which is hereby incorporated by reference.

BACKGROUND OF THE INVENTION

A sensor is a device that measures a physical quantity and converts it into a signal which can be read by an observer or by an instrument. For example, a temperature sensor can generate a current proportional to a temperature that can be read by a voltmeter. Sensors are used in everyday objects such as touch-sensitive elevator buttons and lamps which dim or brighten by touching the base.

SUMMARY

Embodiments of the disclosed invention provide a user customizable monitoring system. For example, in one embodiment, the user customizable monitoring system includes a set of user-selected user-programmable portable sensors and a communication hub for enabling a user to customize features associated with the set of user-programmable portable sensors. In one embodiment, the communication hub is further configured to receive data from the set of user programmable portable sensors and perform a user specified action based on the received data. In some embodiments, a user may select any desired combination of different types of user-programmable portable sensors for use with the communication hub. Additionally, in some embodiments, a user may configure particular parameters associated with a user-programmable portable sensor using the communication hub.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Embodiments of the disclosed invention provide a user customizable monitoring system. As will be further described, in one embodiment, a user may mix and match a number of different types of sensors that come preconfigured to operate with a communication hub. Additionally, in some embodiments, the user may, at a later date, add additional sensors of the same type or different types of sensors to the user customizable monitoring system. In addition, in some embodiments, the communication hub may be used to configure parameters associated with a sensor, monitor the sensor data, and perform one or more actions based on the monitored sensor data.

Figure 1:
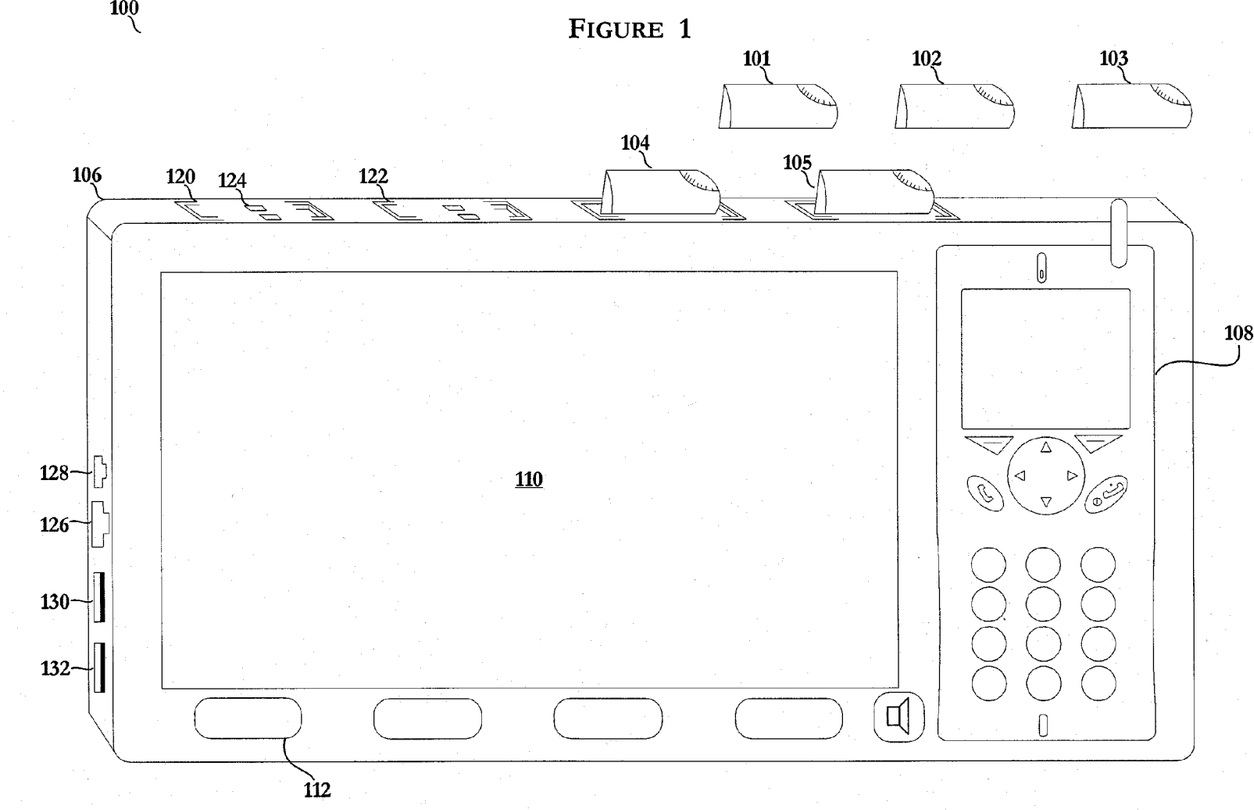
FIG. 1 depicts an embodiment of a user customizable monitoring system.

With reference now to FIG. 1, an embodiment of a user customizable monitoring system 100 is presented. In the depicted embodiment, user customizable monitoring system 100 includes a set of user-programmable portable sensors, such as, but not limited to, user-programmable portable sensors 101-105, and a communication hub 106. As referenced herein, the term "set" means one or more. In one embodiment, user-programmable portable sensors 101-105 may be stored or docked on communication hub 106 when a user-programmable portable sensor is not in use. For example, in one embodiment, communication hub 106 may include a set of ports for coupling one or more of the user programmable portable sensors, such as, but not limited to, docking ports 120 and 122. In some embodiments, docking ports 120 and 122 may include a recharging element 124 for recharging an internal battery associated with a user programmable portable sensor.

In some embodiments, user-programmable portable sensors 101-105 may comprise one or more the same type of sensors. In other embodiments, user-programmable portable sensors 101-105 may comprise one or more different types of sensors. For example, in some embodiments, user-programmable portable sensors 101-105 may include a combination of one or more temperature sensors, sound sensors, motion sensors, and proximity sensors. A temperature sensor is a device configured to measure temperature, such as, but not limited to, generating a current proportional to a temperature that can be read by a voltmeter. A sound sensor is a device configured to measure and/or detect audio sounds. In some embodiments, a user may configure the sound sensor to detect audio sounds above a user-specified decibel level. A motion sensor is a device configured to detect movement. For example, in one embodiment, user-programmable portable sensor with may be configured with a motion sensor to detect movement of the user programmable portable sensor. For instance, in one embodiment, a user programmable portable sensor having a motion sensor may be placed on an object, such as, but not limited to, a window frame, to detect opening of the window. In some embodiments, a user-programmable portable sensor may include a proximity sensor. A proximity sensor is a device configured to detect movement within proximity of the sensor. For example, in one embodiment, a proximity sensor may send out ultrasonic and/or microwaves microwave pulses and measures the reflection of the pulses off an object to detect an object within a field of view of the sensor. In some embodiments, a proximity sensor may also determine the distance of the object from the sensor. Further, in some embodiments, a proximity sensor may also determine a traveling speed of an object.

In another embodiment, user-programmable portable sensors 101-105 may also include one or more natural language sensors, input button sensors, and input touch screen sensors. A natural language sensor is a sensor capable of receiving/identifying human speech. For example, in some embodiments, a natural language sensor may utilize speech recognition software for receiving a user voice command. An input button sensor, as referenced herein, means a sensor that activates and/or performs a specific function in response to being depressed. For example, in one embodiment, an input button sensor may be utilized for placing a predetermined call to a specified number, such as, but not limited to, a 911 call. In some embodiments, a user-programmable portable sensor may include an input touch screen sensor for receiving user input through a touch screen associated with the user programmable portable sensor.

In accordance with one embodiment, a user may select one or any combination of the above identified user-programmable portable sensors in conjunction with purchasing communication hub, such as, but not limited to, communication hub 106. In one embodiment, communication hub 106 may be preconfigured to communicate with the user-selected user-programmable portable sensors. In other embodiments, a user may select from one or more predetermined packages comprising one or more of the above identified user-programmable portable sensors. For example, in some embodiments, a predetermined package may include two proximity sensors, one temperature sensor, and one input button sensor. In addition, in some embodiments, a user may at a later date purchase additional user-programmable portable sensors that are preconfigured to operate with a user's existing communication hub.

In accordance with some embodiments, communication hub 106 may include a telecommunication device 108. Telecommunication device 108 may be, but is not limited to, a cord or cordless handheld telephone handset associated with a hard-line phone connection of communication hub 106. In other embodiments, telecommunication device 108 may a cellular communication device that physically couples to communication hub 106. In some embodiments, the cellular communication device may also communicatively couple to communication hub 106 for the exchanging of data and/or for performing other functions associated with communication hub 106.

In some embodiments, communication hub 106 may include a display 110 for displaying information. In one embodiment, display 110 may include a touch screen component for receiving user input via touch input through display 110. In addition, in some embodiments, communication hub 106 may include one or more function buttons, such as, but not limited to, function button 112. Function button 112 may be, but is not limited to, a hard key for performing a particular action, such as, but not limited to, toggling display 110 on and off. In some embodiments, function button 112 may also be a soft key for performing a dynamic action based on a displayed feature on display 110.

In some embodiments, communication hub 106 may include one or more processing chips for executing computer executable instructions stored in memory, such as, but not limited to, executing computer executable instructions for enabling a user to customize features associated with the set of user-programmable portable sensors 101-105. In one embodiment, communication hub 106 may also include a data storage unit. In some embodiments, the data storage unit may store a configuration file associated with one or more user-programmable portable sensors. For example, in one embodiment, communication hub 106 may store a configuration file that contains a user specified action that is performed in response to receiving a triggering associated with a user-programmable portable sensor, e.g., detecting movement. In addition, the configuration file may also contain an e-mail address and/or cell phone number associated with a user for notifying the user of the event trigger. For example, in some embodiments, communication hub 106 may include an alert module for performing a user specified action based on the data received from one or more user-programmable portable sensors, such as, but not limited to, calling and/or emailing a user with information associated with the one or more user programmable portable sensors. For instance, in some embodiments, communication hub 106 may include a broadband Internet connection 126, such as, but not limited to, an Ethernet port for connecting communication hub 106 to the Internet. In addition, in some embodiments, communication hub 106 may include a telephone port 128 for connecting communication hub 106 to a telephone network.

Additionally, in some embodiments, communication hub 106 may include a transceiver for sending and receiving data wirelessly from the set of user-programmable portable sensors 101-105. For example, the transceiver may utilize radio frequency communication for transmitting and receiving information from the set of user-programmable portable sensors 101-105. Alternatively, in some embodiments, the transceiver may utilize microwave communication and/or infrared (IR) short-range communication.

User customizable monitoring system 100 as illustrated is not intended to assert or imply any type of design or implementation restriction. For example, in regards to the depiction of docking ports 120 and 122, alternative designs and/or implementations for coupling user-programmable portable sensors 101-105 to communication hub may be utilized and are intended to be within the scope of the disclosed embodiments.

Figure 2:
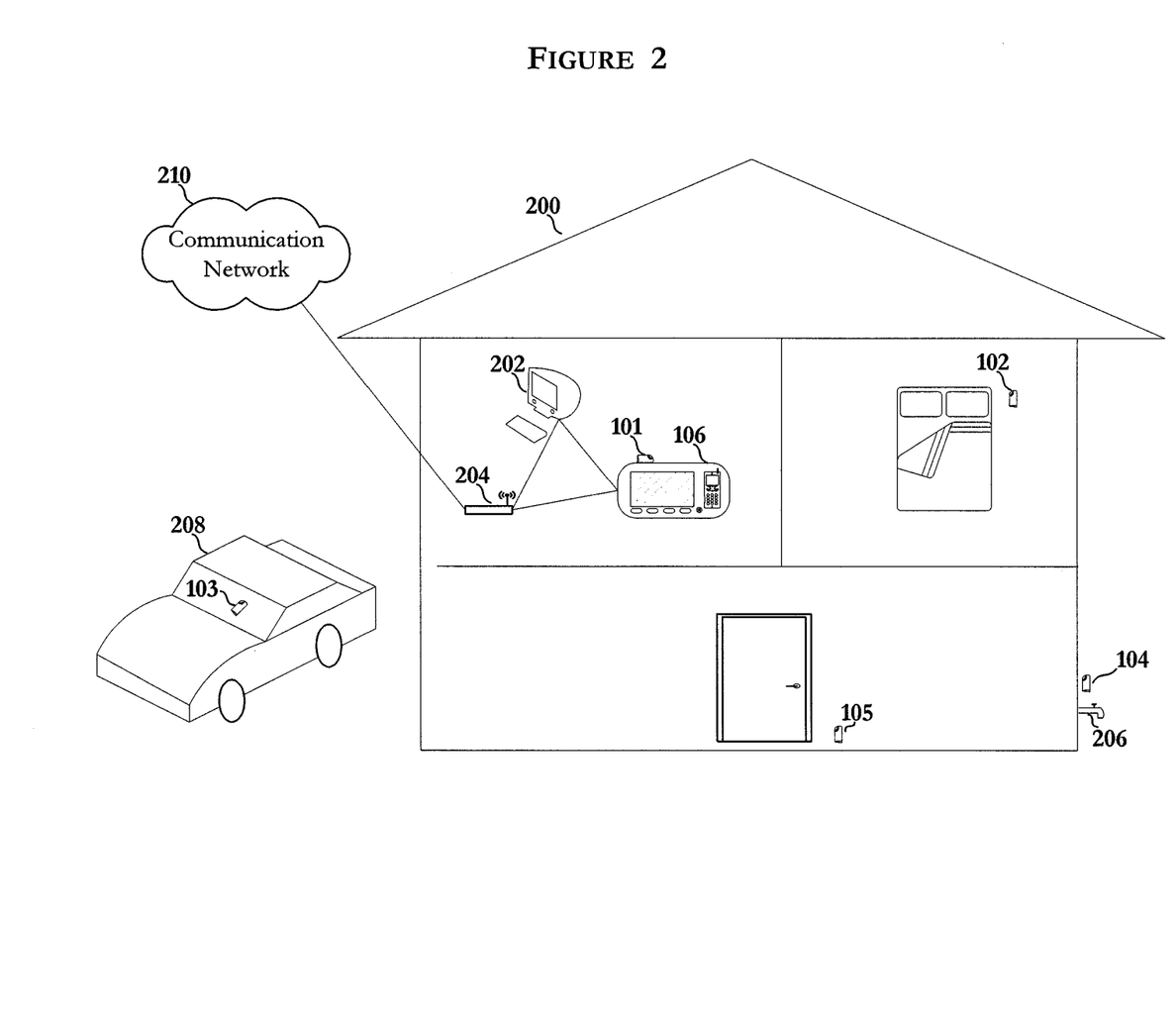
FIG. 2 depicts an embodiment a network environment in which the illustrative embodiments may be implemented.

FIG. 2 depicts an embodiment a network environment in which the illustrative embodiments may be implemented. In the depicted embodiment, user customizable monitoring system 100 is utilized to monitor a residential location 200. However, in other embodiments, user customizable monitoring system 100 may be utilized to monitor a non-residential location, such as, but not limited to, an office and/or school building. In the depicted embodiment, communication hub 106 is placed at a desired location within residential location 200 and a set of user-programmable portable sensors 101-105 are placed at different locations around residential location 200. In some embodiments, the set of user-programmable portable sensors 101-105 must be placed within wireless communication range of communication hub 106. Alternatively, in other embodiments, a user-programmable portable sensor may be placed out of wireless communication range with communication hub 106. For example, in these embodiments, a user-programmable portable sensor may store monitoring information locally and upload the information to communication hub 106 when in wireless communication range and/or when physically coupled to a data port, such as, but not limited to, USB ports 130 and 132 of communication hub 106, as depicted in FIG. 1.

In some embodiments, communication hub 106 may include a touch screen keypad for receiving user input, such as, but not limited to, receiving user configuration input for configuring one or more parameters associated with a user-programmable portable sensor. Additionally, in some embodiments, communication hub 106 may be communicatively coupled to a data processing system, such as, but not limited to, a personal computer 202 located at residential location 200. In addition, in some embodiments, communication hub 106 may be communicatively coupled, either wired or wirelessly, to a cable modem 204 for connecting communication hub 106 to communication network 210. In other embodiments, communication hub 106 may be directly coupled to communication network 210.

In some embodiments, communication network 210 may include a public switched telephone network, a mobile network, such as, but not limited to, a cellular and/or a 3G network, and/or a data network, such as, but not limited to, the Internet for routing communications between communication hub 106 and other network devices, such as, but not limited to, one or more servers. The Internet is a global system of interconnected computer networks that interchange data using the standardized Internet Protocol Suite (TCP/IP). The Internet includes millions of private and public networks that are linked by copper wires, fiber-optic cables, wireless connections, and other technologies. In some embodiments, communication network 210 may also include, but is not limited to, an intranet, a local area network (LAN), a wide area network (WAN), and wireless local area network (WLAN) networks for providing data to communication hub 106.

In the depicted embodiment, one or more user-programmable portable sensors, such as, but not limited to, user-programmable portable sensor 101, may remain docked/stored on communication hub 106 when not in use. In one embodiment, user-programmable portable sensor 102 may include an input button sensor for placing a predetermined call to a specified number, such as, but not limited to, a 911 call when activated. For instance, a user may place user-programmable portable sensor 102 near a bedroom nightstand for quickly alerting police of a break-in. In some embodiments, communication hub 106 may store and play a recorded message associated with user-programmable portable sensor 102.

In some embodiments, user-programmable portable sensor 104 may include a temperature sensor for determining temperature. For instance, in one embodiment, user-programmable portable sensor 104 may be placed near a water pipe 206 for monitoring the temperature around water pipe 206 and alerting a user if the temperature is at or below a user specified temperature, such as, but not limited to, the freezing point of emergency alert break-in bypass module 228, thus, enabling a user to take preventive measures, such as, covering water pipe 206 to help prevent freezing.

In addition, in the depicted embodiment, user-programmable portable sensor 105 may include a proximity sensor for detecting movement, such as, but not limited to, a person entering residential location 200. For instance, in one embodiment, user customizable monitoring system 100 may be utilized as a home monitoring security system for notifying a user of a break-in when the user is away from residential location 200. Additionally, in some embodiments, another proximity and/or motion sensor may be included, in user-programmable portable sensor 103 and placed in an automobile 208 for monitoring automobile 208 when the user is away from residential location 200. For example, in one embodiment, a user may be notified if user-programmable portable sensor 103 detects movement within automobile 208. In addition, in some embodiments, user-programmable portable sensor 103 may include a global positioning chip for enabling a user to determine the location of user-programmable portable sensor 103.

Figure 3:
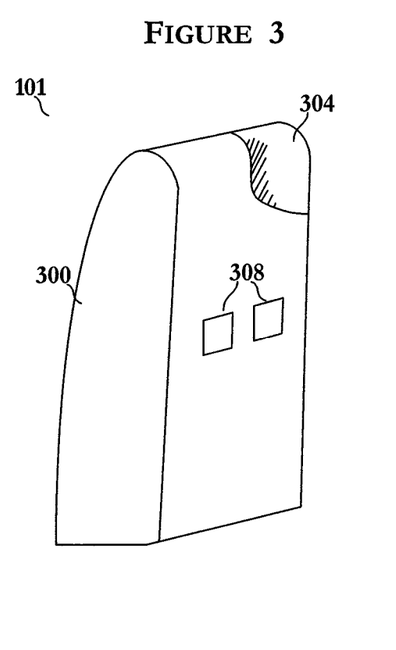
FIG. 3 depicts an external view of an embodiment of a user-programmable portable sensor in accordance with the illustrative embodiments.

FIG. 3 depicts an external view of an embodiment of a user-programmable portable sensor, such as, but not limited to, user-programmable portable sensor 101, in accordance with the illustrative embodiments. In the depicted embodiment, user-programmable portable sensor 101 comprises an external sensor housing 300 for housing a sensor 302 (depicted in FIG. 4). In one embodiment, user-programmable portable sensor 101 may include a lens 304 for enabling viewing of a light indicator 306 (depicted in FIG. 4), such as, but not limited to, a light-emitting-diode (LED).

In some embodiments, user-programmable portable sensor 101 may be distinguishable from other user-programmable portable sensor types based on the color of external sensor housing 300 and/or based on the color of light indicator 306. In addition, in some embodiments, user-programmable portable sensor 101 may include one or more electrical contacts 308 for charging an internal power source 310 (depicted in FIG. 4), such as, but not limited to, a lithium ion battery, when user-programmable portable sensor 101 is docked in docking ports 120 or 122 on communication hub 106.

Figure 4:
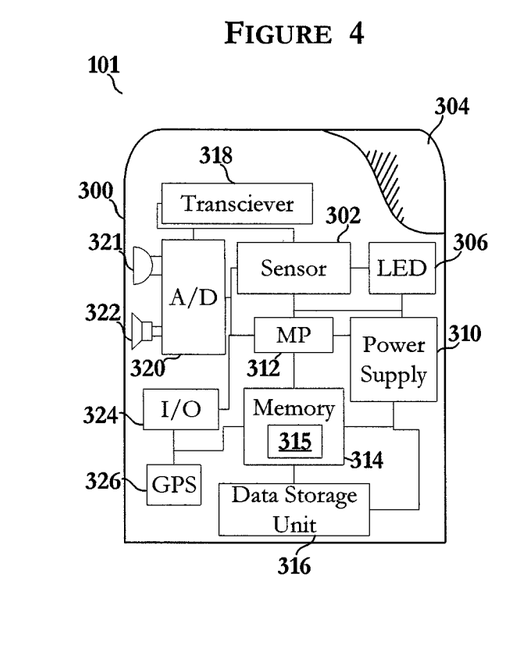
FIG. 4 depicts an internal view of an embodiment of a user-programmable portable sensor in accordance with the illustrative embodiments.

FIG. 4 depicts an internal view of an embodiment of a user-programmable portable sensor 101 in accordance with the illustrative embodiments. In the depicted embodiment, user-programmable portable sensor 101 includes a micro processing unit 312, a memory component 314, a data storage unit 316, and sensor 302.

Microprocessing unit 312 may comprise of one or more microprocessors for executing computer usable program code/instructions associated with user-programmable portable sensor 101. For example, in one embodiment, microprocessing unit 312 may execute computer executable instructions 315 stored in memory component 314 for configuring one or more parameters associated with user-programmable portable sensor 101, monitor and analyze data from sensor 302, and notify communication hub 106 of a triggered event.

In some embodiments, memory component 314 is a volatile memory component of user-programmable portable sensor 101. Volatile memory is memory that loses its contents when user-programmable portable sensor 101 loses power. For example, in some embodiments, memory component 314 may be random access memory (RAM). Random access memory stores currently executing instructions and/or data utilized by an operating system, software application, and/or hardware device.

Data storage unit 316 is a non-volatile memory component of user-programmable portable sensor 101, such as, but not limited to, a hard disk drive. Non-volatile memory retains stored data when power is loss. In some embodiments, data storage unit 316 may be a removable data storage unit, such as, but not limited to, a flash memory card. In one embodiment, user-programmable portable sensor 101 may store monitoring information locally in data storage unit 316 until retrieved by communication hub 106.

Sensor 302 may be any type of sensor device, such as, but not limited to, a temperature sensor and/or a proximity sensor. In some embodiments, user-programmable portable sensor 101 may include multiple sensors. For example, in one embodiment, user-programmable portable sensor 101 may include a redundant sensor 302. In other embodiments, user-programmable portable sensor 101 may include one or more different types of sensor 302.

As stated above, in some embodiments, user-programmable portable sensor 101 may include a light indicator 306, such as, but not limited to, a light-emitting-diode (LED). In some embodiments, the color of light indicator 306 may indicate the type of sensor associated with user-programmable portable sensor 101. In other embodiments, light indicator 306 may be utilized to indicate active data transmission, such as, but not limited to, when user-programmable portable sensor 101 communicates data wirelessly to communication hub 106 and/or when a user is configuring user-programmable portable sensor 101.

In some embodiments, user-programmable portable sensor 101 may include a transceiver 318 for sending and receiving data. For example, in one embodiment, transceiver 318 may utilize radio frequency transmission for sending and receiving data from communication hub 106. In other embodiments, transceiver 318 may utilize, but is not limited to, infrared for sending and receiving data.

In some embodiments, user-programmable portable sensor 101 may include an analog to digital converter and/or digital to analog converter 320 for converting between analog and digital signals. For instance, in one embodiment, user-programmable portable sensor 101 may include a microphone 321 for receiving analog signals, such as, but not limited to, a voice command, and converting the analog signal to digital format for further processing by micro processing unit 312. Additionally, in some embodiments, user-programmable portable sensor 101 may include a speaker 322 for outputting an audio signal, such as, but not limited to, an audible alarm.

In addition, in some embodiments, user-programmable portable sensor 101 may include a set of input/output components 324 for physically coupling user-programmable portable sensor 101 to an external device, such as, but not limited to, communication hub 106, for data exchange. For example, in one embodiment, input/output components 324 may include a male USB component for coupling user-programmable portable sensor 101 to USB port 130 of communication hub 106. In some embodiments, the male USB component of user-programmable portable sensor 101 may be retractable into external sensor housing 300.

Further, in some embodiments, user-programmable portable sensor 101 may include a global positioning system (GPS) chip 326 for enabling a user to determine the location of user-programmable portable sensor 101. In one embodiment, a user may activate GPS chip 326 remotely to retrieve the location of user-programmable portable sensor 101. In other embodiments, GPS chip 326 may periodically transmit its location information to communication hub 106.

Figure 5:
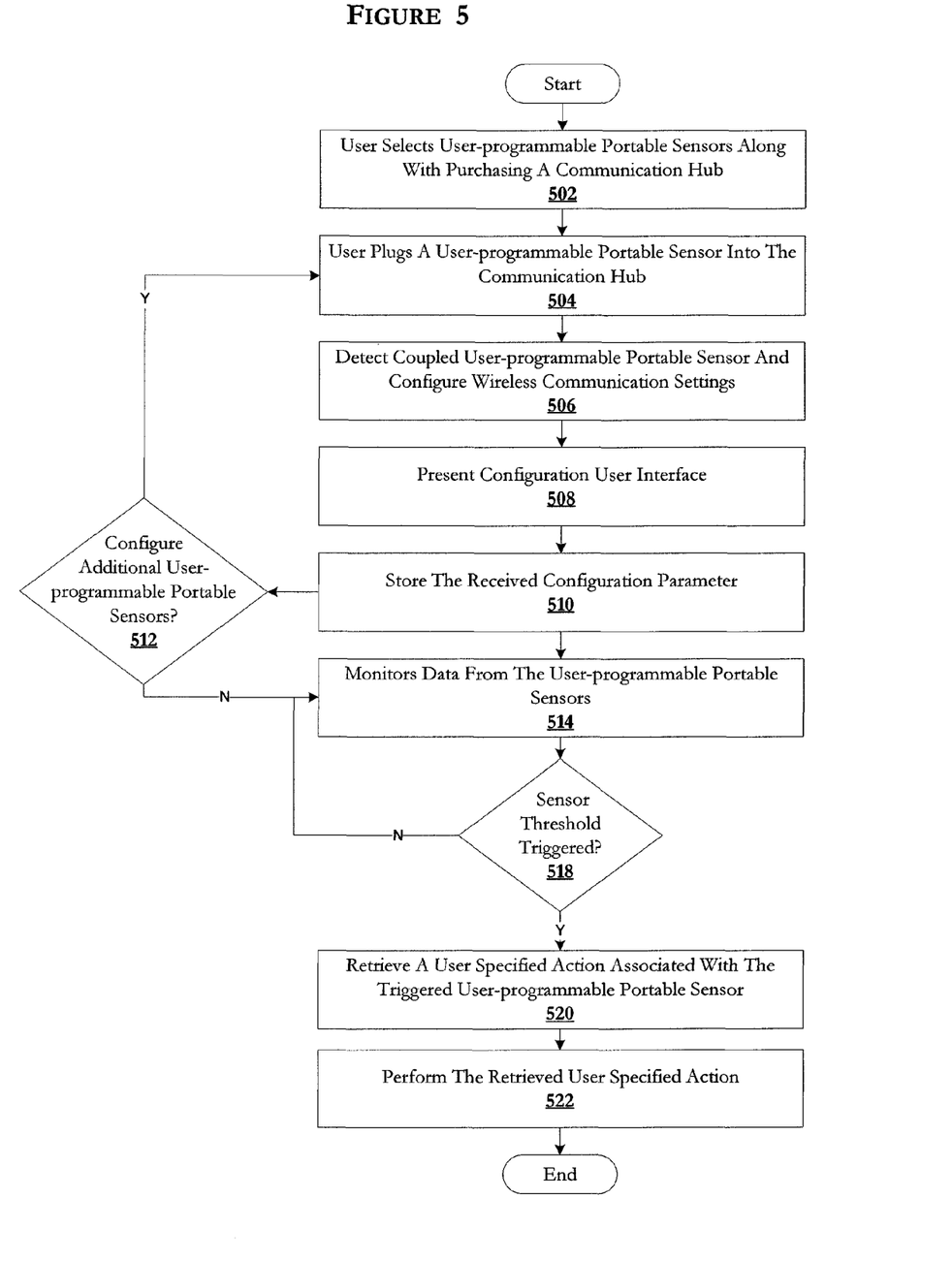
FIG. 5 depicts a flowchart illustrating an embodiment of a process for providing a user customizable monitoring system in accordance with the illustrative embodiments of the invention.

FIG. 5 depicts a flowchart illustrating an embodiment of a process 500 for providing a user customizable monitoring system in accordance with the illustrative embodiments of the invention. Process 500 begins, at step 502, with a user selecting one or more user-programmable portable sensors in conjunction with purchasing a communication hub. At step 504, the user plugs a user-programmable portable sensor into the communication hub. The communication hub, at step 506, detects the coupled user-programmable portable sensor and configures the wireless communication settings of the coupled user-programmable portable sensor for enabling wireless data transfer between the communication hub and the user-programmable portable sensor. In one embodiment, the communication hub, at step 508, presents a configuration user interface for configuring parameters associated with the coupled user-programmable portable sensor. At step 510, the communication hub stores the received configuration parameter associated with the coupled user-programmable portable sensor. At step 512, the user may configure additional user-programmable portable sensors by repeating steps 504-510.

At step 514, the communication hub monitors data from the one or more user-programmable portable sensors. In some embodiments, the data may be retrieved from the one or more user-programmable portable sensors in real time. In other embodiments, the data may be retrieved at periodic intervals. In some embodiments, the communication hub initiates the data transfer request. Alternatively, in some embodiments, the one or more user-programmable portable sensors may automatically transmit the monitoring data to the communication hub.

At step 518, the communication hub determines from the received data whether a sensor threshold has been triggered. For example, the sensor threshold may be a temperature below a user specified value. In other embodiments, the sensor threshold determination is performed locally by the monitoring user-programmable portable sensor. In these embodiments, the monitoring user-programmable portable sensor may transmit data to the communication hub only in the event of a sensor threshold trigger.

In response to identifying a sensor threshold trigger, the communication hub, at step 520, retrieves a user specified action associated with the triggered user-programmable portable sensor. For example, in one embodiment, an e-mail is sent to a user specified address containing the triggering information associated with the triggered user-programmable portable sensor. For instance, in one embodiment, if the triggered user-programmable portable sensor includes a proximity sensor, the time and date the sensor is triggered may be e-mailed to the user. At step 522, the communication performs the retrieved user specified action, with process 500 terminating thereafter.

Accordingly, the disclosed embodiments present a monitoring system that is user-friendly and user customizable. By distributing one or more user-programmable portable sensors around a house, office, or other location, a user can maintain a reliable monitoring system that can be easily configured and updated by the user. For example, the user may modify the monitoring system at any time by adding additional user-programmable portable sensors.

As will be appreciated by one skilled in the art, certain aspects of the disclosed embodiments may be embodied as an apparatus, method, or computer program product. In addition, the disclosed embodiments including, but not limited to, the disclosed modules may be implemented entirely with hardware or as a software embodiment (including firmware, resident software, micro-code, etc.) or an embodiment combining software and hardware aspects. Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A user customizable monitoring system, comprising:
a set of user-programmable portable sensors; and
a communication hub comprising at least one physical port for plugging in one or more of the user-programmable portable sensors, a first communication interface for communicating with the set of user-programmable portable sensors and a second communication interface that provides communication over a communication network, the communication hub being configured to:
receive input from a user to customize features associated with the set of user-programmable portable sensors;
store, in a memory of a first user-programmable sensor, one or more configuration parameters when the first user-programmable sensor is plugged into the physical port, to configure behavior of the first user-programmable sensor;
receive data from the set of user programmable portable sensors; and
perform a user specified action in response to the received data, wherein performing a user specified action comprises communicating with a data processing system over the communication network, based on the received data.

2. The user customizable monitoring system of claim 1, wherein the user programmable portable sensors includes a data storage component for storing monitoring information locally until the communication hub receives the data from the user programmable portable sensors via a physical connection.

3. The user customizable monitoring system of claim 1, wherein the user programmable portable sensors each include a transceiver for wirelessly transmitting and receiving data to and from the communication hub.

4. The user customizable monitoring system of claim 1, wherein the set of user-programmable portable sensors is selected from a plurality of user-programmable portable sensors, wherein a user programmable portable sensor within the plurality of user programmable portable sensors is configured with one of a set of sensors, the set of sensors comprising a temperature sensor, a touch sensor, a motion sensor, and a proximity sensor.

5. The user customizable monitoring system of claim 4, wherein the set of sensors further comprises a natural language sensor, an input button sensor, and an input touch screen sensor.

6. The user customizable monitoring system of claim 5, wherein a user programmable portable sensor within the plurality of user programmable portable sensors is configured with a combination of two or more sensors from the set of sensors.

7. The user customizable monitoring system of claim 1, wherein the set of user-programmable portable sensors include a first set of sensors configured to perform a first function and a second set of sensors configured to perform a second function.

8. The user customizable monitoring system of claim 7, wherein the set of user-programmable portable sensors further include a third set of sensors configured to perform a third function.

9. The user customizable monitoring system of claim 7, wherein the first set of sensors and the second set of sensors may be any combination of a set of sensors comprising a temperature sensor, a touch sensor, a motion sensor, and a proximity sensor, a natural language sensor, an input button sensor, and an input touch screen sensor, and wherein the user selects the combination.

10. The user customizable monitoring system of claim 1, wherein the set of user programmable portable sensors are uniformly shaped and are distinguishable by color based on a function performed by a user programmable portable sensor.

11. The user customizable monitoring system of claim 1, further comprising a second set of user programmable portable sensors that are added to the user customizable home monitoring system at a later date and are preconfigured to function with the communication hub.

12. The user customizable monitoring system of claim 1, wherein the user places the set of user programmable portable sensors in one or more desired locations within a home location and wherein a user programmable portable sensor may be moved from a first location to a second location.

13. The user customizable monitoring system of claim 1, wherein a user programmable portable sensor comprises a sensor housing, a sensor, a lens, and a light emitting diode.

14. The user customizable monitoring system of claim 1, wherein the communication network comprises a wireless network.

15. The user customizable monitoring system of claim 1, wherein the communication network comprises the Internet.

16. The user customizable monitoring system of claim 1, wherein communicating over the communication network comprises transmitting the received data for reception by the data processing system.

17. The user customizable monitoring system of claim 1, wherein the set of user-programmable portable sensors comprises a first sensor and a second sensor, wherein performing a user specified action comprises performing a user specified action in response to receiving data from the first sensor and performing a second user specified action in response to receiving data from the second sensor, and wherein the first user specified action is different from the second user specified action.

18. The user customizable monitoring system of claim 1, wherein the communication hub includes a set of ports for coupling one or more of the user programmable portable sensors for recharging an internal battery associated with the one or more user programmable portable sensors.

19. The user customizable monitoring system of claim 1, wherein the communication hub includes a set of ports for communicatively coupling one or more of the user programmable portable sensors to the communication hub to enable data exchange.

20. A method for providing a user customizable monitoring system, the method comprising:
configuring, with a communication hub, a set of user-programmable portable sensors, the communication hub comprising at least one physical port for plugging in one or more of the user-programmable portable sensors, a first communication interface for communicating with the set of user-programmable portable sensors and a second communication interface that provides communication over a communication network;
storing, in a memory of a first user-programmable sensor, one or more configuration parameters when the first user-programmable sensor is plugged into the physical port, to configure behavior of the first user-programmable sensor;
receiving data from the set of user-programmable portable sensors; and
performing a user-specified action in response to the received data, wherein performing a user specified action comprises communicating with a data processing system over the communication network, based on the received data.

* * * * *